US006517746B1

(12) United States Patent
Saxe et al.

(10) Patent No.: US 6,517,746 B1
(45) Date of Patent: Feb. 11, 2003

(54) POLYHALIDE PARTICLES AND LIGHT VALVES COMPRISING SAME

(75) Inventors: Robert L. Saxe, New York, NY (US); Barry Fanning, Patchogue, NY (US); Steven M. Slovak, Massapequa, NY (US); Robert I. Thompson, deceased, late of Plainview, NY (US), by Jean Thompson, legal representative

(73) Assignee: Research Frontiers Incorporated, Woodbury, NY (US)

( * ) Notice: Subject to any disclaimer, the term of this patent is extended or adjusted under 35 U.S.C. 154(b) by 0 days.

(21) Appl. No.: 09/743,565

(22) PCT Filed: Jul. 9, 1999

(86) PCT No.: PCT/US99/15564

§ 371 (c)(1),
(2), (4) Date: Jan. 5, 2001

(87) PCT Pub. No.: WO00/03178

PCT Pub. Date: Jan. 20, 2000

Related U.S. Application Data

(60) Provisional application No. 60/092,311, filed on Jul. 9, 1998.

(51) Int. Cl.[7] ............................. F21V 9/14; G02B 26/00; G02F 1/17
(52) U.S. Cl. ..................... 252/585; 252/582; 252/583; 359/296
(58) Field of Search ............................... 252/582, 583, 252/585; 359/296

(56) References Cited

U.S. PATENT DOCUMENTS

| 2,041,138 A | | 5/1936 | Land .............................. 18/57 |
| 2,178,996 A | | 11/1939 | Land .............................. 252/6 |
| 2,289,712 A | | 7/1942 | Land ........................... 260/284 |
| 4,131,334 A | | 12/1978 | Witte et al. ................. 359/485 |
| 4,247,175 A | | 1/1981 | Saxe ........................... 350/362 |
| 4,270,841 A | * | 6/1981 | Saxe ........................... 252/585 |
| 4,407,565 A | | 10/1983 | Saxe ........................... 350/374 |
| 4,877,313 A | | 10/1989 | Saxe et al. ................... 350/391 |
| 5,002,701 A | | 3/1991 | Saxe ........................... 252/586 |
| 5,093,041 A | | 3/1992 | Check, III et al. .......... 252/585 |
| 5,130,057 A | * | 7/1992 | Saxe ........................... 252/584 |
| 5,409,734 A | | 4/1995 | Lee et al. ................. 427/163.1 |
| 5,463,491 A | | 10/1995 | Check, III ................... 359/296 |
| 5,463,492 A | | 10/1995 | Check, III ................... 359/296 |
| 5,516,463 A | | 5/1996 | Check, III et al. .......... 252/585 |

FOREIGN PATENT DOCUMENTS

EP 0551136 A1 * 7/1993 ............. G02F/1/17

* cited by examiner

Primary Examiner—Robert Dawson
Assistant Examiner—Jeffrey B. Robertson
(74) Attorney, Agent, or Firm—Cooper & Dunham L.L.P.

(57) ABSTRACT

A polyhalide light-polarizing material comprising a complex obtained by reacting: (a) elemental iodine; (b) a hydrohalide acid or an ammonium halide, alkali metal halide or alkaline earth metal halide; (c) a first compound capable of chelating hydrogen, ammonium or metal ions; and (d) a second compound comprising at least one chelating group present in the first compound and either (1) at least one group of the first compound is changed to a different group or (2) the second compound comprises at least one additional group.

12 Claims, No Drawings

POLYHALIDE PARTICLES AND LIGHT VALVES COMPRISING SAME

This application claims benefit of provisional application Ser. No. 60/092,311 filed Jul. 9, 1998.

FIELD OF THE INVENTION

The present invention relates to polyhalide particles of improved stability for use in light valves and in set suspensions and to a method of making such particles.

BACKGROUND

1. The Light Valve

Light valves have been known for over sixty years for modulation of light. As used herein, a light valve may be described as a cell formed of two walls that are spaced apart by a small distance, at least one wall being transparent, the walls having electrodes thereon usually in the form of transparent conductive coatings. The cell contains a light-modulating element, which may be either a liquid suspension of particles or a plastic film in which droplets of a liquid suspension of particles are distributed and encapsulated.

The liquid suspension (sometimes herein called a liquid light valve suspension) comprises small particles suspended in a liquid suspending medium. In the absence of an applied electrical field, the particles in the liquid suspension exhibit random Brownian movement, and hence a beam of light passing into the cell is reflected, transmitted or absorbed, depending upon the cell structure, the nature and concentration of the particles and the energy content of the light. The light valve is thus relatively dark in the OFF state. However, when an electric field is applied through the light valve suspension in the light valve, the particles become aligned and for many suspensions most of the light can pass through the cell. The light valve is thus relatively transparent in the ON state.

Light valves have been proposed for many purposes including, e.g., alpha-numeric displays, television displays, windows, sunroofs, sunvisors, mirrors, eyeglasses and the like to control the amount of light passing there through. Light valves of the type described herein are also known as "suspended particle devices" or "SPDs".

For many applications, it is preferable for the activatable material to be a plastic film rather than a liquid suspension. For example, in a light valve used as a variable light transmission window a plastic film in which droplets of liquid suspension are distributed is preferable to a liquid suspension alone because hydrostatic pressure effects e.g., bulging, associated with a high column of liquid suspension can be avoided through use of a film, and the risk of possible leakage can also be avoided. Another advantage of using a plastic film is that in a plastic film the particles are generally present only within very small droplets, and hence do not noticeably agglomerate when the film is repeatedly activated with a voltage.

A "light valve film" as used herein is thus a film having droplets of a liquid suspension of particles distributed in the film.

A type of light valve film made by phase separation from a homogeneous solution is disclosed in U.S. Pat. No. 5,409,734. Light valve films made by cross-linking emulsions are disclosed in U.S. Patent Nos. 5,463,491 and 5,463,492 assigned to the assignee of the present invention. All of those patents and other patents and articles cited herein are incorporated herein by reference.

For use in set suspensions such as light-polarizing sheets, sometimes called "sheet polarizers", which can be cut up and formed into polarized sunglass lenses or used as filters, light-polarizing particles can be dispersed or distributed throughout a sheet of suitable film-forming material, such as cellulose acetate or polyvinyl alcohol or the like. Methods of making set suspensions for use in sheet polarizers are well known in the prior art. In these set suspensions, however, the particles are immovable. See e.g., U.S. Pat. Nos. 2,178,996 and 2,041,138.

2. Liquid Light Valve Suspension

A. Liquid Suspending Media and Stabilizers

The liquid light valve suspension for use with the particles obtained from the method of the present invention may be any liquid light valve suspension known in the art and may be formulated according to known techniques. The term "liquid light valve suspension" as used herein means a "liquid suspending medium" in which a plurality of small particles is dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed and in suspension.

The liquid light valve suspension of the present invention may include any of the liquid suspending media previously proposed for use in light valves for suspending the particles. Liquid suspending media known in the art are useful herein, such as but not limited to the liquid suspending media disclosed in U.S. Pat. Nos. 4,247,175 and 4,407,565. In general one or both of the liquid suspending medium or the polymeric stabilizer dissolved therein is chosen so as to maintain the suspended particles in gravitational equilibrium.

The polymeric stabilizer when employed, can be a single type of solid polymer that bonds to the surface of the particles but also dissolves in the non-aqueous liquid or liquids of the liquid suspending medium. Alternatively, there may be two or more solid polymeric stabilizers serving as a polymeric stabilizer system. For example, the particles can be coated with a first type of solid polymeric stabilizer such as nitrocellulose, which in effect, provides a plain surface coating for the particles and one or more additional types of solid polymeric stabilizer that bond to or associate with the first type of solid polymeric stabilizer and also dissolve in the liquid suspending medium to provide dispersion and steric protection for the particles. Also, liquid polymeric stabilizers may be used to advantage, especially in SPD light valve films, as described in U.S. Pat. No. 5,463,492.

B. Particles

As is known, inorganic and organic particles may be used in a light valve suspension. However, the present invention relates to an improved method of preparing particles that are polyhalides (sometimes referred to in the prior art as perhalides) of alkaloid acid salts and the like. The polyhalide particles of the present invention may be light-polarizing, such as halogen-containing light-polarizing materials, e.g., polyhalides of alkaloid acid salts. (The term "alkaloid" is used herein to mean an organic nitrogenous base, as defined in Hackh's Chemical Dictionary, Fourth Edition, McGraw-Hill Book Company, New York, 1969). As is known, if a polyhalide of an alkaloid acid salt is prepared, the alkaloid moiety may be a quinine alkaloid, as defined in Hackh's Chemical Dictionary, supra. U.S. Pat. Nos. 2,178,996 and 2,289,712 refer in detail to the use of polyhalides of quinine alkaloid acid salts. The particles may be light-absorbing or light-reflecting.

Also, the particles of the present invention may be a hydrogenated polyhalide of a quinine alkaloid acid salt, such as dihydrocinchonidine sulfate polyiodide, as described in U.S. Pat. No. 4,131,334.

More recently, improved polyhalide particles having advantageous features for use in light valves have been proposed in U.S. Pat. Nos. 4,877,313, 5,002,701, 5,093,041 and 5,516,463. These "polyhalide particles" are formed by reacting organic compounds, usually containing nitrogen, with elemental iodine and a hydrohalide acid or an ammonium halide, alkali metal halide or alkaline earth metal halide. These "polyhalide particles" can be advantageously prepared by the method of the present invention.

Prior art polyhalide particles are also discussed in detail in "The Optical Properties and Structure of Polyiodides" by D. A. Godina and G. P. Faerman published in The Journal of General Chemistry, U.S.S.R. Vol. 20 pp. 1005–1016, (1950). Herapathite, for example, is quinine bisulfate polyiodide, and its formula is given under the heading "quinine iodosulfate" as $4C_{20}H_{24}N_2O_2.3H_2SO_4.2HI.I4.6H_2O$ in The Merck Index, 10th Ed. (Merck & Co., Inc., Rahway, N.J.). In polyiodide compounds, the iodine anion is thought to form chains and the compounds are strong light polarizers. See U.S. Pat. No. 4,877,313 and Teitelbaum et al. JACS 100 (1978), pp. 3215–3217. The term "polyhalide" is used herein to mean a compound such as a polyiodide, but wherein at least some of the iodide anion may be replaced by another halide anion.

As is known, polyhalide particles that are useful for light valves are preferably of colloidal size, that is the particles will have a large dimension averaging about 1 micron or less. It is preferred that most polyhalide particles have large dimensions less than one-half of the wavelength of blue light, i.e. 2000 Angstroms or less to keep light scatter extremely low.

For intended commercial uses it is necessary that the polyhalide particles used in a liquid light valve suspension, whether or not incorporated into a film, have great chemical and environmental stability. Historically, the early liquid light valve suspensions comprised particles of Herapathite, referred to above. However, Herapathite and closely related compounds had poor stability to many chemicals and degraded readily when exposed to either ultraviolet radiation or high temperatures. Some improvement in stability was observed for polyhalide particles made from salts of certain alkaloids which, unlike quinine, had been hydrogenated and did not include a methoxy group. See e.g., U.S. Pat. No. 4,131,334. Other types of polyhalide particles having still better heat stability and not based on alkaloids were disclosed in U.S. Pat. Nos. 4,877,313 and 5,002,701.

Also, U.S. Pat. No. 5,516,463 discloses, inter alia, greatly improved light-polarized polyiodide particles formed by reacting iodine and calcium iodide with the compound pyrazine 2,5-dicarboxylic acid dihydrate. Although this polyhalide particle represented a significant advance over prior art particles for use in light valves, its chemical stability was still less than optimum. For example, polyhalide particles made from pyrazine-2,5-dicarboxylic acid degrade over a period of time when contacted with water. This degradation is evidenced by the formation of an off-white solid precipitate when the polyhalide particle is soaked in water.

Accordingly, a yet more stable type of polyhalide light-polarizing particle is desirable for uses where a high degree of chemical and/or environmental stability is needed, especially in light-polarizing sheets and in liquid light valve suspensions and light valve films for light valves.

SUMMARY OF THE INVENTION

The present invention comprises polyhalide light-polarizing particles having improved properties, and liquid and set suspensions and films comprising the same. These improved particles are made by forming a complex of (a) elemental iodine, (b) a hydrohalide acid or an ammonium halide, alkali metal halide or alkaline earth metal halide, (c) a first compound capable of chelating hydrogen, ammonium, or metal ions (said compound hereinafter sometimes called the "Precursor") and (d) a second compound comprising at least one chelating group also present in the Precursor and otherwise structurally identical to the Precursor except that in the second compound either (1) at least one group of the Precursor is changed to a different group or (2) the second compound comprises at least one additional group (said second compound hereinafter sometimes called the "Modified Precursor"). Any amount of Modified Precursor that is effective can be used, up to about 100 mol % of the Precursor.

As used herein, as between the above mentioned first and second compounds, if a greater quantity of one compound than the other is used is forming the complex, the compound which is present in greater amount relative to the other, measured in mol percent, shall be deemed to be the Precursor, and the other compound the Modified Precursor. If the compounds are present in equal mol percents, then either compound may be deemed to be the Precursor and the other compound the Modified Precursor.

The Precursor may be any of the compounds previously used to form organic polyhalide particles by reaction with elemental iodine and a hydrohalide acid or an ammonium, alkali metal or alkaline earth metal halide. For example, the Precursor may be a quinine alkaloid acid salt (U.S. Pat. Nos. 2,178,996 and 2,289,712), a hydrogenated alkaloid acid salt (U.S. Pat. No. 4,131,334) or an organic compound containing one or more groups that chelate hydrogen, ammonium or metal ions (U.S. Pat. Nos. 4,877,313, 5,002,701, 5,093,041 and 5,516,463), all of such U.S. patents being incorporated herein by reference thereto.

It is presently preferred to use as the Precursor, pyrazine-2,5-dicarboxylic acid. (U.S. Pat. No. 5,516,463), and to use as the Modified Precursor, the mono-alkyl ester or the monoamide of pyrazine-2,5-dicarboxylic acid, most preferably in the form of the dihydrate of the diacid Precursor and the monohydrate of the monoacid Modified Precursor, respectfully. The alkyl moiety of the monoester may preferably contain from 1 to about 20 carbon atoms. The nitrogen atom of the monoamide may be substituted by one or two alkyl groups, each preferably of from 1 to about 10 carbon atoms.

Preferably, in forming a given type of polyhalide particle, the amount of Modified Precursor used will range from about 0.01 mol % to about 10 mol % of the amount of the Precursor more preferably, from about 0.1 mol % to about 5 mol %, and most preferably from about 0.2 mol % to about 3 mol % of the amount of the Precursor.

For many of the polyhalide particles of the present invention the changed or additional groups which the Modified Precursor comprises are non-polymeric. However, such groups may also be polymeric, and thus such group or groups in a given Modified Precursor may be either polymeric, non-polymeric or a mixture thereof.

In the case where the Modified Precursor comprises a group changed so as to be different from a group in the Precursor, said changed group in the Modified Precursor may be either larger or smaller than the group in the Precursor. For example, if the Precursor comprises a carboxyl group, the Modified Precursor could have in its place a smaller group such as a halide atom or a methyl group or, alternatively, a larger group such as an alkyl ester or a dialkyl amide group. In some cases it is possible to chemically modify the Precursor to change the group and form the Modified Precursor from the Precursor; in other cases the Modified Precursor, including the changed group, may be synthesized by any other suitable procedure known in the art. As indicated above, the term "group" as used herein can be as small as one atom. Hence if the Precursor is pyrazine-2,5-dicarboxylic acid, the compound pyridine-2,5-dicarboxylic acid could be considered a Modified Precursor for it, even though the only change in structure would be substitution of a carbon atom for a nitrogen atom in the ring.

When changed groups in the Modified Precursor are large compared to the corresponding groups in the Precursor, it has been observed that polyhalide particles made according to the present invention tend to have a smaller average size than prior art polyhalide particles made under similar conditions without Modified Precursor. Thus we have concluded that the Modified Precursor can act as a crystal growth inhibitor, and that such Modified Precursor molecules are likely to be located on the crystal surfaces. Thus it is readily possible to modify the surface properties of polyhalide particles by selecting a suitable Modified Precursor.

Based on our observations of numerous instances where all of the Precursor and Modified Precursor appear to have been used up in forming polyhalide light-polarizing crystals, we have concluded that the Precursor and Modified Precursor co-crystallize along with the halide and elemental iodine that are present when the crystalline particles of this invention are formed. This conclusion is also consistent with the fact that some particles of the present invention exhibit significantly different properties such as enhanced stability with respect to water and ultraviolet radiation, described hereinafter, compared to the properties of prior art polyhalide particles formed without Modified Precursor.

As discussed above, a wide variety of Precursors are usable in the present invention, such as those disclosed in the prior art. Thus the Precursor can be of any type and may, for example, comprise aromatic, aliphatic and/or aralkyl groups or fused rings, and the changed or additional groups in the Modified Precursor can be of any type, provided that such group does not prevent formation of stable polyhalide particles or, where intended for use in a liquid or set suspension, does not render the particles soluble in the suspending medium.

DETAILED DESCRIPTION OF THE INVENTION

Example 1 sets forth a conventional procedure from the prior art for making polyiodide crystals (particles) and a liquid suspension of them.

EXAMPLE 1 (PRIOR ART)

Formulation for Making Polyiodide Crystals and a Liquid Light Valve Suspension Thereof In an appropriate size jar add, in the order shown, the following reactants:

| | |
|---|---|
| 160 g. | a solution of 6.98% ¼ sec ss-type Nitrocellulose (dry), dissolved in Hexyl Acetate |
| 3 g. | Pyrazine-2,5-dicarboxylic acid dihydrate (Precursor) |
| 4.5 g. | Iodine |
| 2.64 g. | anhydrous Calcium Iodide |
| 1.8 g. | anhydrous Methanol |
| 0.33 g. | water |

Cap jar and shake for approximately ½ hour. Place jar in sonicator until solution turns completely blue, about 10 hours. Inspect solution under microscope to determine that the Precursor, $CaI_2$ and $I_2$ are fully reacted, i.e., that there is no substantial amount of unreacted Precursor. Maximum yield is obtained when the initial decay time is between 8–15 milliseconds. If the decay time is less than 8 milliseconds rerun the formulation with about 0.05 g. $H_2O$ added after the methanol.

The decay time is determined by the following procedure. A suspension of the formed particles in a light valve suspending medium is filled into a light valve cell comprising glass sheets carrying suitable electrodes, spaced 5 mils apart. The light valve suspension is illuminated with continuous illumination such as from a tungsten lamp. The suspension of particles in the light valve is energized by applying to the electrodes about 55 volts at 10 kHz to a baseline measurement. About 2–3 milliseconds are required to reach an open state of the light valve, and approximately 20 milliseconds thereafter the electrical field is discontinued. Decay to the fully closed (off) state of the light valve is measured thereafter. (See col. 2, lines 37–48 of U.S. Pat. No. 5,516,463.)

Centrifuge the solution at 11,500 RPM for 1 hour and discard the supernatant. Drain tubes upside down on paper towel for 15 minutes. Put the sediment from the tubes in tared glass jar and record the sediment weight. Add 15 g. hexyl acetate for each gram of sediment. Disperse sediment by shaking for ½ hour followed by 10 hours of sonication.

Centrifuge dispersion at 2500 RPM for 5–15 minutes and decant and collect supernatant. The decay time should be 8 to 12 milliseconds; if higher, recentrifuge supernatant.

Centrifuge supernatant at 9,500 RPM for ½ hour and discard the supernatant. Drain tubes upside down on paper towel for 15 minutes. Collect sediment in a tared glass jar and add 10 g. of anhydrous isopentyl acetate for each gram of sediment. Disperse sediment by shaking for ½ hour followed by 10 hours of sonication. This is referred to below as the "initial concentrate".

Tri-n-pentyl-trimellitate (TNPTM), which is a plasticizer liquid as described in col. 4, lines 48–66 of U.S. Pat. No. 5,463,491, is added to the initial concentrate in an amount of 9 g., and the combination placed in a Rotovap apparatus for 2 hours at 60° C. to evaporate the isopentyl acetate. The amount of TNPTM to be added can be determined empirically depending on how concentrated with particles one desires the resulting final concentrate (i.e., the dried initial concentrate) to be. The final concentrate can then be diluted with any other desired solvent or solvents in which the concentrate polymer is soluble. Of course, other plasticizer liquids can be used.

To prepare a concentrate for use in an SPD light valve film, however, in accordance with the teachings of one embodiment of U.S. Pat. No. 5,463,492 instead of adding TNPTM to the abovementioned initial concentrate before evaporating the isopentyl acetate, one can add a liquid polymer such as a copolymer of n-butyl acrylate/heptafluorobutyl acrylate/hydroxyethyl acrylate.

EXAMPLES 2A–2E

Polyiodide crystals of the particles of the present invention were prepared as in Example 1 except that the monomethyl ester, mono-ethyl ester or mono-isopropyl ester of pyrazine-2,5-dicarboxylic acid was used as a Modified Precursor. The identity of the specific Modified Precursor, and the mol ratios of the Precursor to Modified Precursor, are set forth in Tables 1 and 2, which follow Example 4. In addition some additional water is incorporated in the reaction mixture in order to compensate for the crystal growth inhibition that can be caused by the presence of the Modified Precursor. It is known from the prior art that an increase in the amount of water in the reaction tends to increase particle size, and hence offsets the tendency of a Modified Precursor to do the opposite. See U.S. Pat. No. 5,516,463. In Examples 2A to 2F extra water in the amount of about 0.20 g. beyond the amount used in Example 1 was used satisfactorily. The amount of extra water beyond what is shown in Example 1 is preferably determined empirically for each different Modified Precursor and according to the amount of such Modified Precursor used.

A liquid suspension of the particles of Examples 2A–2E was made by following the procedure described in Example 1.

As shown in Examples 2A–2E, the Modified Precursor may be derivatives of the Precursor, Pyrazine-2,5-dicarboxylic acid dihydrate. Whether or not stated hereinafter, such Modified Precursors are preferably usually hydrates. The Modified Precursor could, for example, be a monoester of the Precursor such as but not limited to 5-Methoxycarbonyl-2-Pyrazine carboxylic acid; 5-Ethoxycarbonyl-2-Pyrazine carboxylic acid; 5-Isopropoxycarbonyl-2-Pyrazine carboxylic acid; or 5-Octanoxycarbonyl-2-Pyrazine carboxylic acid, and the like. A convenient method for making these Modified Precursors is to first make the corresponding diesters of the Precursor, and then partially hydrolyze each such diester.

Examples 5–8 describe methods of making the diesters referred to in the preceding paragraph, and Examples 9–12 describe methods for making the Modified Precursors from the corresponding diesters. Example 13 describes a method of making a monamide as the Modified Precursor.

In order to demonstrate the effectiveness of the present invention to enhance the stability of polyhalide particle suspensions to ultraviolet radiation and water, we have devised extremely severe accelerated tests, which measure the color change of such suspensions when subjected to such stresses. Example 3 discloses a procedure for testing the stability of a polyhalide particle suspension to ultraviolet radiation and Example 4 discloses a procedure for testing the stability of such a suspension to water. Tables 1 and 2 summarize the test results and clearly indicate that suspensions for which the particles comprise some Modified Precursor have greater stability to water and ultraviolet radiation than the suspensions of the prior art, whose particles comprise no Modified Precursor. In these tests the prior art suspension particles comprise pyrazine-2,5-dicarboxylic acid as the Precursor. Because Delta E is a measure of the color change of a suspension (i.e., degradation), the lower values of Delta E indicate superior performance.

EXAMPLE 3

Procedure for Testing the Stability of Polyhalide Particle Suspensions to Ultraviolet Radiation 1. In a 1 oz. jar 0.1 grams of crystals coated with a small amount of nitrocellulose polymer and dispersed in Isopentyl acetate are diluted with 9.9 grams of Isopentyl acetate.
2. Some of the suspension from the jar is placed in a test cell made of ITO-coated glass substrates with a 33-mil internal gap and a screw cap. The cell is placed in the Byk Gardner Colorsphere visible spectrophotometer. Initial color measurements referred to as L, a, and b data are taken and saved on the computer.
3. The cell is then placed in the Hereaus Suntest CPS UV exposure unit. (Max. Irradiance 765 W/m$^2$.)
4. After exposing the cell to UV for the desired time the cell is placed on the Colorsphere, and the difference in color and light transmission from the initial measurement is output as Delta E. Delta E is computed as described in ASTM methods E805–94 and D2244–93.
5. The same cell is further exposed to UV for one or more additional time periods and after each such period Delta E is obtained as in step 5.

EXAMPLE 4

Procedure for Testing the Stability of Polyhalide Particle Suspensions to Water

1. In a 1 oz. jar 0.1 grams of crystals coated with a small amount of nitrocellulose polymer and dispersed in Isopentyl acetate are diluted with 9.9 grams of Isopentyl acetate.
2. Some of the suspension from the jar is placed in a test cell made of ITO-coated glass substrates with a 33-mil internal gap. The cell is placed in the Byk Gardner Colorsphere visible spectrophotometer. Initial color measurements referred to as L, a, and b data are taken and saved on the computer.
3. 0.025 grams of water is added to the jar which is capped and shaken on a Vortex Genie II at a setting of 6 for a desired time.
4. After shaking, the cell is then refilled with suspension from the jar and is then placed on the Colorsphere, and the difference in color and light transmission from the initial measurement is output as Delta E. Shaking of the jar is recommenced.
5. After selected time intervals additional samples are taken to obtain additional Delta E values.

TABLE 1

Comparison of the Relative Stabilities to Water of Prior Art Suspensions and Suspensions of the Present Invention

| Suspensions of Particles Incorporating Modified Precursors: | Type of Modified Precursor Used | Weight % of Modified Precursor In Particles as % of Precursor | Corresponding Mol % of Modified Precursor Used | Delta E | Exposure Time (minutes) |
|---|---|---|---|---|---|
| Suspensions of Prior Art Polyiodide Particles | | | | 13.25 | 1131 |
| Example 2A | Mono-methyl ester of the Precursor | 0.5 | 0.49 | 5.15 | 1265 |
| Example 2B | Mono-methyl ester of the Precursor | 1.0 | 0.98 | 4.33 | 1289 |
| Example 2C | Mono-ethyl ester of the Precursor | 0.5 | 0.52 | 6.08 | 1293 |
| Example 2D | Mono-ethyl ester of the Precursor | 1.0 | 1.05 | 4.96 | 1283 |
| Example 2E | Mono-isopropyl ester of the Precursor | 0.5 | 0.56 | 5.66 | 1422 |

TABLE 2

Comparison of the Relative Stabilities to Ultraviolet Radiation of Prior Art Suspensions and Suspensions of the Present Invention

| Suspensions of Particles Incorporating Modified Precursors: | Type of Modified Precursor Used | Weight % of Modified Precursor In Particles as % of Precursor | Corresponding Mol % of Modified Precursor Used | Delta E | Exposure Time (minutes) |
|---|---|---|---|---|---|
| Suspensions of Prior Art Polyiodide Particles | | | | 26.31 | 1152 |
| Example 2A | Mono-methyl ester of the Precursor | 0.5 | 0.49 | 12.04 | 1260 |
| Example 2C | Mono-ethyl ester of the Precursor | 0.5 | 0.52 | 13.34 | 1260 |
| Example 2D | Mono-ethyl ester of the Precursor | 1.0 | 1.05 | 9.93 | 1260 |

EXAMPLE 5

Preparation of 2.5-Dimethyl Pyrazine Dicarboxylate

A slurry of anhydrous 2,5-pyrazine diacid (44.7 g.) and concentrated sulfuric acid (2.0 mL) in dry methanol (500 mL) was heated to reflux in a mechanically stirred 3-neck reaction flask fitted with a reflux condenser. Complete reaction was indicated by dissolution of all reactants to form a clear amber solution. This solution was neutralized by the addition of sodium hydrogen carbonate, filtered, and reduced to dryness in a rotary evaporator. The solids were redissolved in chloroform and cooled in a −30° C. freezer overnight. The resulting crystals were isolated by filtration, washed with heptane and allowed to air dry. The off-white crystals melt to an amber oil at 168° C. to 169° C. 1H NMR: 9.29 ppm (s, 2H), 3.97 ppm (s, 6H).

EXAMPLE 6

Preparation of 2.5-Diethyl Pyrazine Dicarboxylate

A slurry of anhydrous 2,5-pyrazine diacid (140.3 g.), ethanol (1.5 L), toluene (1 L) and concentrated sulfuric acid (2.8 mL) was heated to reflux in a mechanically stirred 4 L 4-port resin kettle fitted with a large Dean-Stark trap, reflux condenser, thermometer and septa. Reflux was initiated and trap contents were collected and dried over $MgSO_4$ before being filtered and returned to the reaction kettle. Complete reaction was indicated by dissolution of all reactants to form a clear amber solution. 1.5 L solvent was distilled and the remaining reaction mixture was filtered hot. Residual solids were washed 3 times with 50 mL aliquots of hot toluene. The solution was reduced to 300 mL in a rotary evaporator and allowed to slowly cool. The resulting crystals were isolated by filtration, washed with toluene and recrystallized from heptanes. Yield 147.2 g. (79%). The off-white crystals melt to a white oil at 61° C. to 62° C. 1H NMR: 9.38 ppm (s, 2H), 4.54 ppm (q, J=7 Hz, 4H), 1.47 ppm (t, J=7 Hz 6H). IR: 1728 (C=O), 1474, 1326, 1295, 1157 $cm^{-1}$.

EXAMPLE 7

Preparation of 2.5-Diisopropyl Pyrazine Dicarboxylate

Following the procedure for 2,5-Diethyl Pyrazine Dicarboxylate, substituting isopropanol for ethanol, the isopropyl diester was prepared in 80% yield. The tan crystals melt to an amber oil at 79° C. to 82° C. 1H NMR: 9.35 ppm (s, 2H), 5.38 ppm (heptet, J=6 Hz, 42H), 1.43 ppm (d, J=7 Hz, 6H). IR: 1720 (C=O), 1473, 1375, 1275, 1161, 1104 cm$^{-1}$.

EXAMPLE 8

Preparation of 2,5-Dioctyl Pyrazine Dicarboxylate

A slurry of anhydrous 2,5-pyrazine diacid (10.072 g.), 1-octanol (30.0 mL), and concentrated sulfuric acid (2.5 mL) in xylenes (200 mL) was heated to reflux in a mechanically stirred 3-neck 250 mL reaction flask fitted with a Dean-Stark trap, reflux condenser and septum. Complete reaction was indicated by dissolution of all reactants to form a clear amber solution. The reaction solution was filtered hot and residual solids were washed 3 times with 15 mL aliquots of hot heptanes. The solution was allowed to slowly cool and the resulting crystals isolated by filtration, washed with toluene and allowed to air dry. The off-white crystals melt to an amber oil at 93° C. to 95° C. 1H NMR: 9.38 ppm (s, 2H), 3.47 ppm (t, J=7 Hz, 4H), 1.84 ppm (m, J=7 Hz, 4H), 1.44 ppm to 1.28 ppm (m, 20H), 0.88 ppm (t, J=7 Hz, 6H). IR: 1728 (C=O), 1473, 1325, 1292, 1156 cm$^{-1}$.

EXAMPLE 9

Preparation of 5-Methoxycarbonyl-2 Pyrazine Carboxylic Acid

The diester and 0.8 equivalents KOH were dissolved in dry methanol. The reaction was stirred overnight and the resulting slurry filtered and washed with cold methanol. The solids were dissolved in water and refiltered. The resulting solution was carefully acidified to pH 4 with 2 M HCI. The solids isolated by filtration were washed with water, air dried and recrystallized from acetone to yield an off-white powder m.p. 183° C. to 185° C. 1H NMR: 9.54 ppm (s, 1H), 9.37 ppm (s, 1H), 4.11 ppm (s, 3H).

EXAMPLE 10

Preparation of 5-Ethoxycarbonyl-2-Pyrazine Carboxylic Acid

The diester and 0.8 equivalents KOH were dissolved in dry ethanol. The reaction was stirred overnight and the resulting slurry filtered and washed with cold ethanol. The solids were dissolved in water and refiltered. The resulting solution was carefully acidified to pH 4 with 2 M HCI. The solids isolated by filtration were washed with water, air dried and recrystallized from acetone to yield an off-white powder m.p. 150° C. to 153° C. 1H NMR: 9.53 ppm (s, 1H), 9.38 ppm (s, 1H), 4.57 ppm (q, J=7 Hz, 2H), 1.49 ppm (t, J=7 Hz, 3H). IR: 3438, 1711, (C=O), 1699, (C=O), 1377, 1295, 1346, 1272, 1161 cm$^{-1}$.

EXAMPLE 11

Preparation of 5-Isopropoxycarbonyl-2-Pyrazine Carboxylic Acid

The diester and 0.8 equivalents KOH were dissolved in dry isopropanol. The reaction was stirred overnight and the resulting slurry filtered and washed with cold isopropanol. The solids were dissolved in water and refiltered. The resulting solution was carefully acidified to pH 4 with 2 M HCI. The solids isolated by filtration were washed with water, air dried and recrystallized from acetone to yield an off-white powder m.p. 149° C. to 152° C. 1H NMR: 9.53 ppm (s, 1H), 9.34 ppm (s, 1H), 5.40 ppm (heptet, 1H), 1.46 ppm (d, 6H). IR: 3447, 1744, (C=O), 1726, (C=O), 1398, 1375, 1290, 1280, 1158 cm$^{-1}$.

EXAMPLE 12

Preparation of 5-Octanoxycarbonyl-2-Pyrazine Carboxylic Acid

The diester and 0.3 equivalents 18-crown-6 were dissolved in dry glyme (1,2-dimethoxyethane). 0.9 equivalents KOH were added as the solid and the reaction stirred 5 days. The resulting slurry was filtered and the solution taken to dryness with a rotary evaporator. The solids were extensively washed with hot heptane and the resulting insoluble solids dissolved in a minimum of water. The resulting solution was carefully acidified to pH 4 with 2 M HCI. The solids isolated by filtration were washed with water, dried, and recrystallized from acetone to yield a white powder m.p. 142° C. to 143° C. 1H NMR: 9.53 ppm (s, 1H), 9.34 ppm (s, 1H), 5.40 ppm (heptet, 1H), 1.46 ppm (d, 6H). IR: 3447, 1728, (C=O), 1696, (C=O), 1325, 1313, 1296, 1281, 116, 1027 cm$^{-1}$.

Polymeric monoesters can be synthesized either (a) by reacting one acid group of a Precursor such as pyrazine-2, 5-dicarboxylic acid dihydrate with a monocarbinol terminated polymer such as monocarbinol-terminated polystyrene or monocarbinol-terminal polydimethyl siloxane to form the monoester or (b) reacting both acid groups with the monocarbinol-terminated polymer and then hydrolyzing one ester group.

The Modified Precursor may comprise an amide functional group instead of an ester group. Example 13 discloses a method for preparing the Mono-N,N-di-n-propylamide of a Precursor.

EXAMPLE 13

Preparation of the Mono-N,N-di-n-Propylamide of Pyrazine-2,5-Dicarboxylic Acid

A thin slurry of anhydrous pyrazine-2,5-dicarboxylic acid in dry toluene was heated to 70° C. in a stirred reaction flask fitted with a reflux condenser and liquid addition port. One equivalent neat thionyl chloride was added slowly to this warm mixture. The reaction was allowed to reflux for 4 hours (vapors testing negative for acidity by moist pH paper) at which time a catalytic amount of N,N-dimethylaminopyridine was added as pyridine solution. A solution of di-n-propylamine (1.1 equivalents) in dry pyridine (1:2 v/v) was then added. The reaction mixture darkened and thickened appreciably with this addition. The reaction was allowed to stir overnight. The brown slurry was filtered using a buchner funnel and Whatman #52 filter paper. These solids were resuspended in acetone, stirred 5 minutes, refiltered, acetone washed and air dried. The crude mono-N,N-di-n-propyl amide of pyrazine-2,5-dicarboxylic acid was recrystallized by dissolving in a minimum of hot DMSO and adding distilled water to incipient cloudiness. On cooling, filtration, and washing with copious amounts of water and acetone, followed by air drying one obtains the title compound as a free flowing brown powder. m.p. 267° C.–269° C. (dec.).

The Modified Precursors described in the preceding Examples 5–13 are examples where an acid group in the Precursor has been chemically changed to become an ester or an amide group also comprising an alkyl group. To the extent that such Modified Precursor molecules become incorporated in the surface of polyhalide particles in place of a Precursor molecule, the particle surface can be expected to become less polar and more hydrophobic. Such alkyl-containing groups can also act as steric buffers and reduce particle degradation that can be caused by exposure to ultraviolet radiation.

What is claimed is:

1. A polyhalide light polarizing material comprising a complex obtained by reacting: (a) elemental iodine; (b) a hydrohalide acid or an ammonium halide, alkali metal halide or alkaline earth metal halide; (c) a first compound comprising a pyrazine-2,5-dicarboxylic acid; and (d) a second compound comprising a mono-alkyl ester or a mono-amide of a pyrazine-2,5-dicarboxylic acid.

2. The light polarizing material of claim 1, wherein the first compound is a dihydrate of the dicarboxylic acid and the second compound is a monohydrate of the dicarboxylic acid.

3. The light polarizing material of claim 1, wherein the mono-alkyl ester is a mono $C_1$–$C_{20}$ alkyl ester and the nitrogen of the monoamide is optionally substituted by one or more alkyl groups.

4. A method of making a polyhalide light-polarizing material comprising forming a complex by reacting:

(a) elemental iodine; (b) a hydrohalide acid or an ammonium halide, alkali metal halide or alkaline earth metal halide; (c) a first compound capable of chelating hydrogen, ammonium or metal ions; and (d) a second compound comprising a mono-alkyl ester or a mono-amide of a pyrazine-2,5-dicarboxylic acid.

5. The method of claim 4 wherein the first compound is a dihydrate of a pyrazine-2,5-dicarboxylic acid and the second compound is a monohydrate of the pyrazine-2,5-dicarboxylic acid.

6. The method of claim 4 wherein the mono-alkyl ester is a mono $C_1$–$C_{20}$ alkyl ester and the nitrogen of the mono-amide is optionally substituted by one or more alkyl groups.

7. The polyhalide light-polarizing material of claim 3 wherein the nitrogen of the monoamide is substituted by one or more $C_1$–$C_{10}$ alkyl groups.

8. The polyhalide light polarizing material of claim 1 wherein the amount of the second compound ranges from about 0.01 mol % to about 10 mol % of the first compound.

9. In a light valve, comprising a cell containing a suspension of light-polarizing particles in a liquid suspending medium, the improvement wherein the light polarizing particles are comprised of the light polarizing material of claim 1.

10. The method of claim 4, wherein the first compound is a pyrazine-2,5-dicarboxylic acid.

11. The method of claim 6 wherein the nitrogen of the monoamide is substituted by one or more $C_1$–$C_{10}$ alkyl groups.

12. The method of claim 4, wherein the amount of the second compound ranges from about 0.01 mol % to about 10 mol % of the first compound.

* * * * *